July 7, 1925.
C. O. GUERNSEY
RAILWAY MOTOR COACH
Filed July 14, 1922 — 5 Sheets-Sheet 1
1,544,574
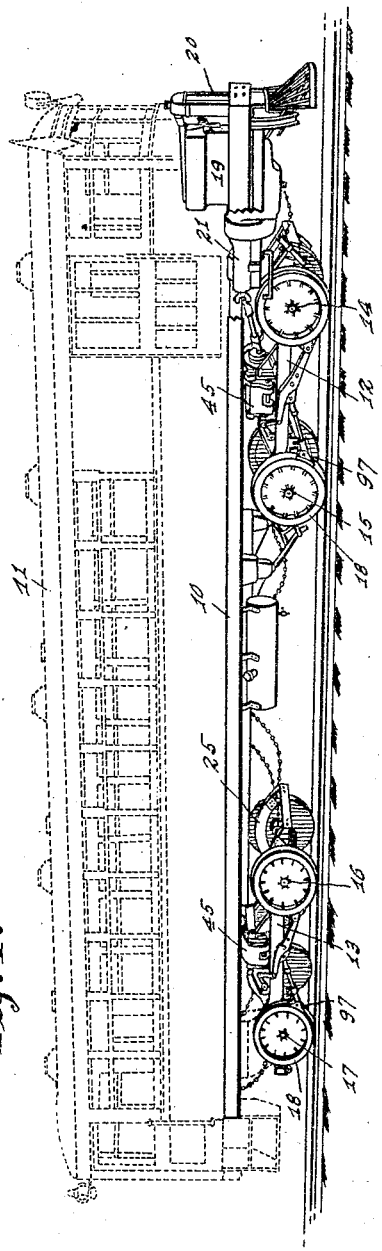
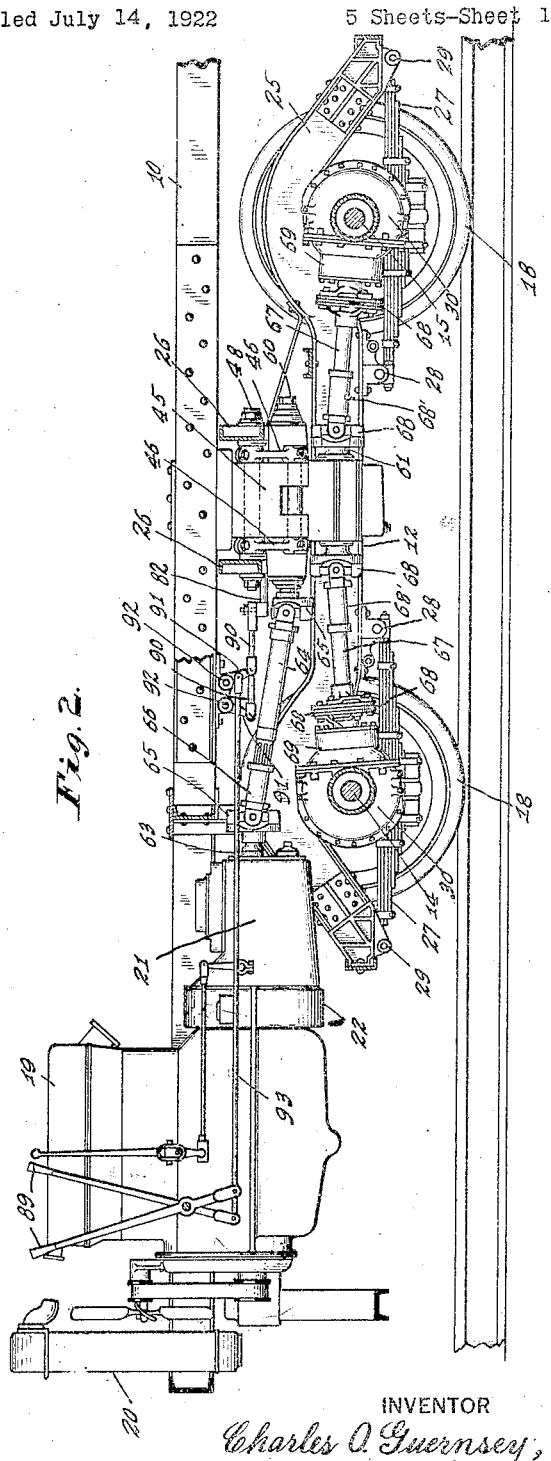
INVENTOR
Charles O. Guernsey,
BY
ATTORNEY July 7, 1925.
C. O. GUERNSEY
RAILWAY MOTOR COACH
Filed July 14, 1922
1,544,574
5 Sheets-Sheet 2
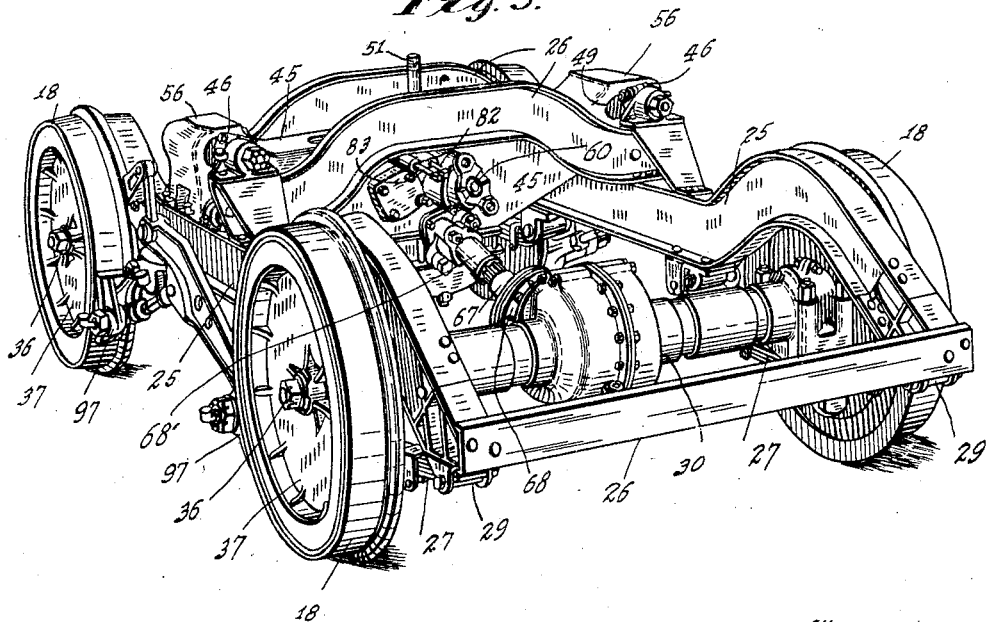
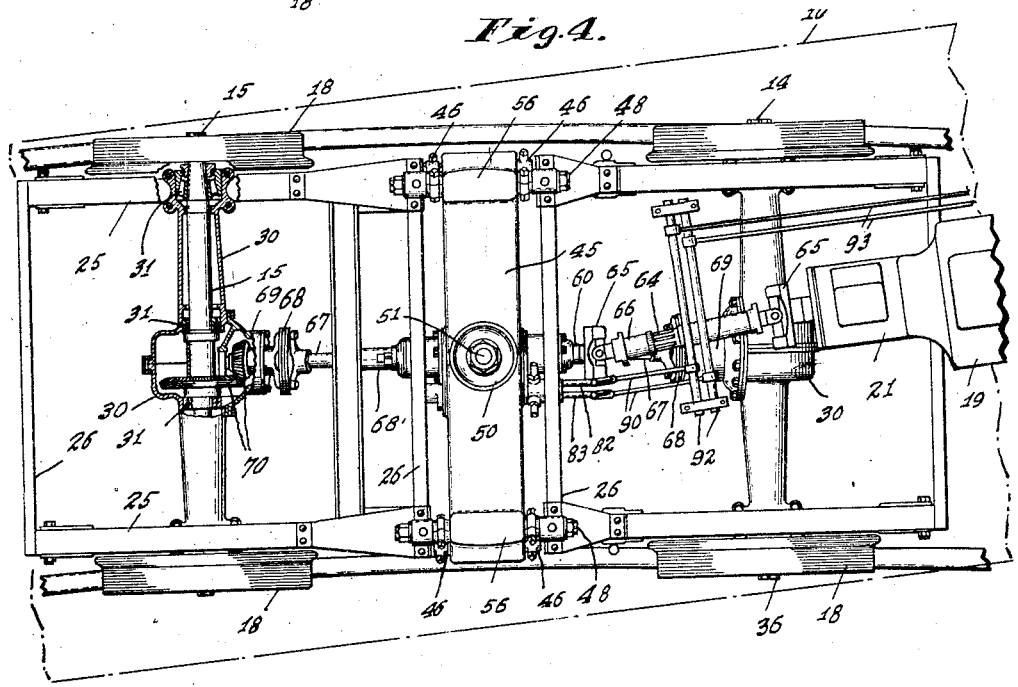
INVENTOR
Charles O. Guernsey
BY
—ATTORNEY July 7, 1925.
C. O. GUERNSEY
1,544,574
RAILWAY MOTOR COACH
Filed July 14, 1922  5 Sheets-Sheet 3
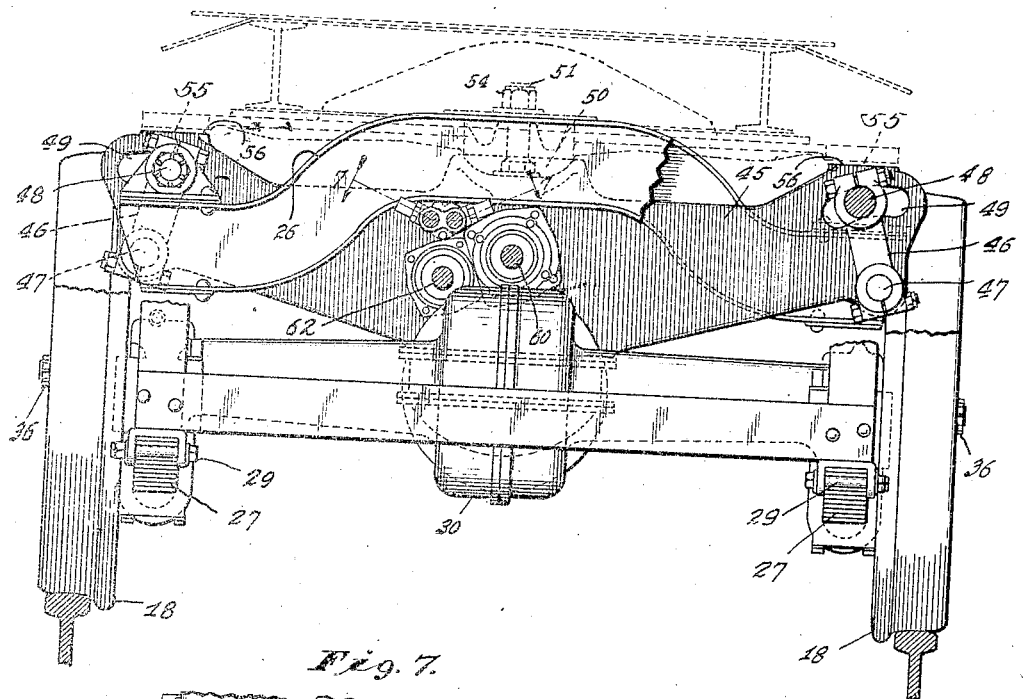
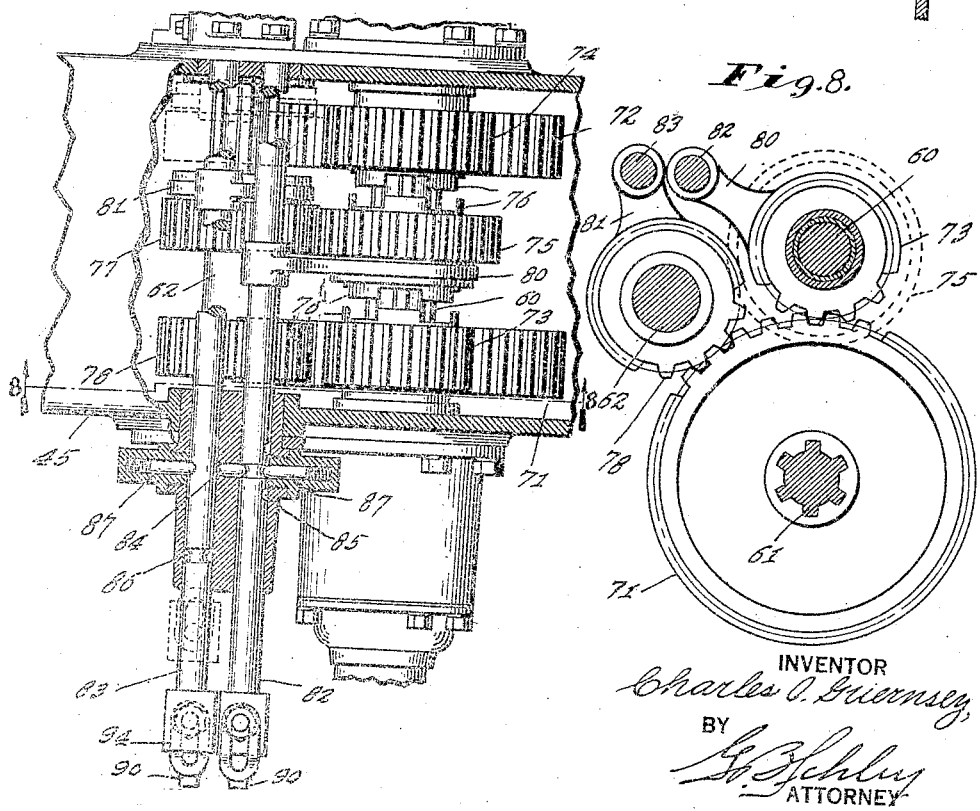
INVENTOR
Charles O. Guernsey,
BY
ATTORNEY

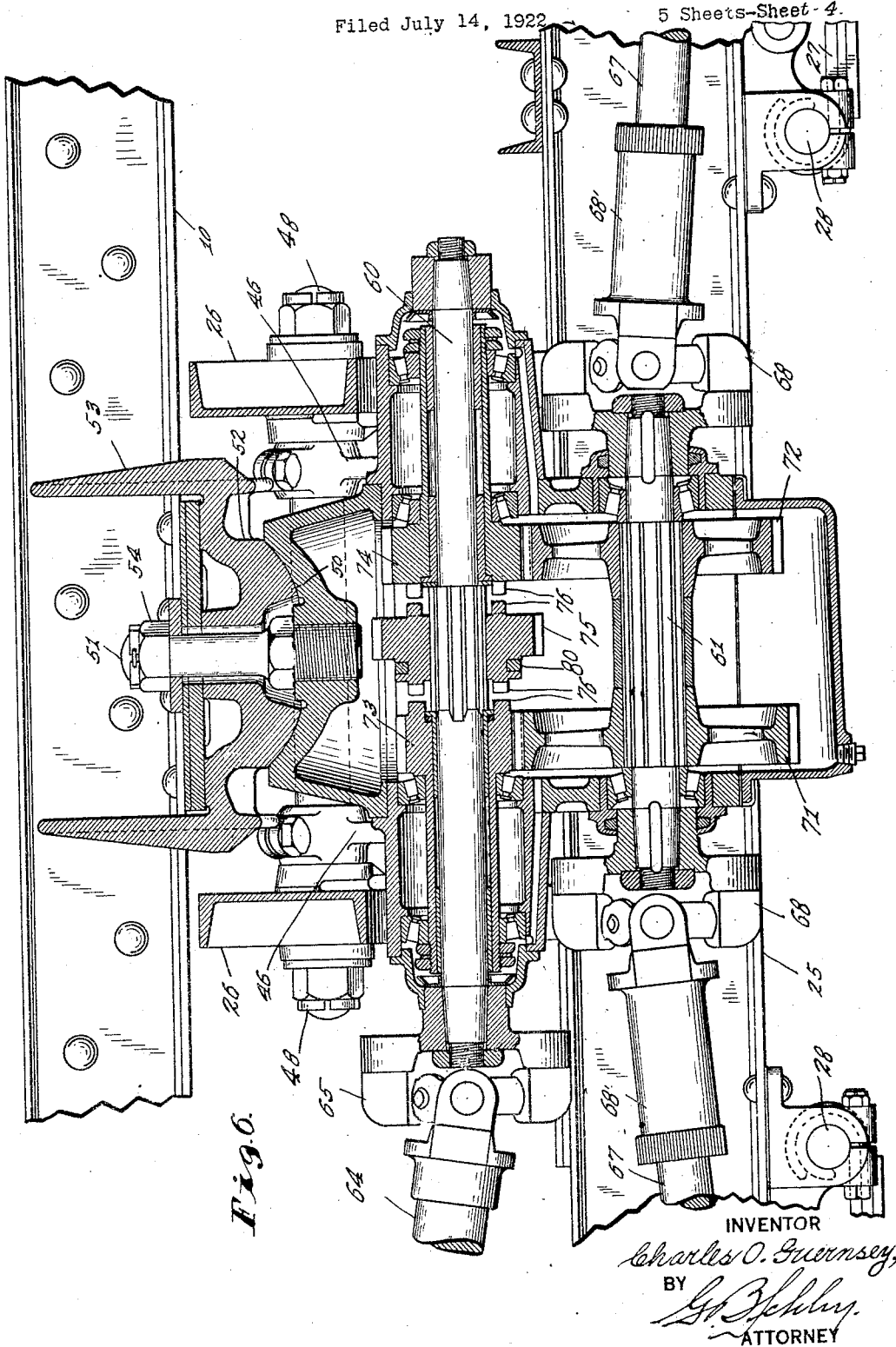

July 7, 1925.

C. O. GUERNSEY

RAILWAY MOTOR COACH

Filed July 14, 1922    5 Sheets-Sheet 5

1,544,574

Patented July 7, 1925.

1,544,574

UNITED STATES PATENT OFFICE.

CHARLES O. GUERNSEY, OF WABASH, INDIANA.

RAILWAY MOTOR COACH.

Application filed July 14, 1922. Serial No. 574,886.

*To all whom it may concern:*

Be it known that I, CHARLES O. GUERNSEY, a citizen of the United States, residing at Wabash, in the county of Wabash and State of Indiana, have invented a new and useful Railway Motor Coach, of which the following is a specification.

It is the object of my invention to produce a practical railway motor coach driven by an internal combustion engine. It is a further object to mount such a coach on a plurality of plural-axle trucks, and to use a plurality of axles on the same truck as driving axles, driven from a single engine carried by the coach body. It is a further object to provide an efficient transmission mechanism, whereby a plurality of speeds may be obtained by a plurality of equally efficient drives. It is a further object to provide a construction in which the major working parts are all contained in either the power unit or the driving trucks; and in which either of these may be easily and quickly removed separately, as for overhauling and repair. It is a further object to provide a resilient mounting of the coach whereby the unsprung weight will be reduced to a minimum, and the truck frames themselves will be resiliently mounted; and to provide a drive to the truck axles which will permit the relative movement between such axles and the truck frames required by such resilient mounting without interfering with the efficiency of the drive.

Other objects of my invention will appear hereinafter.

Figure 9:
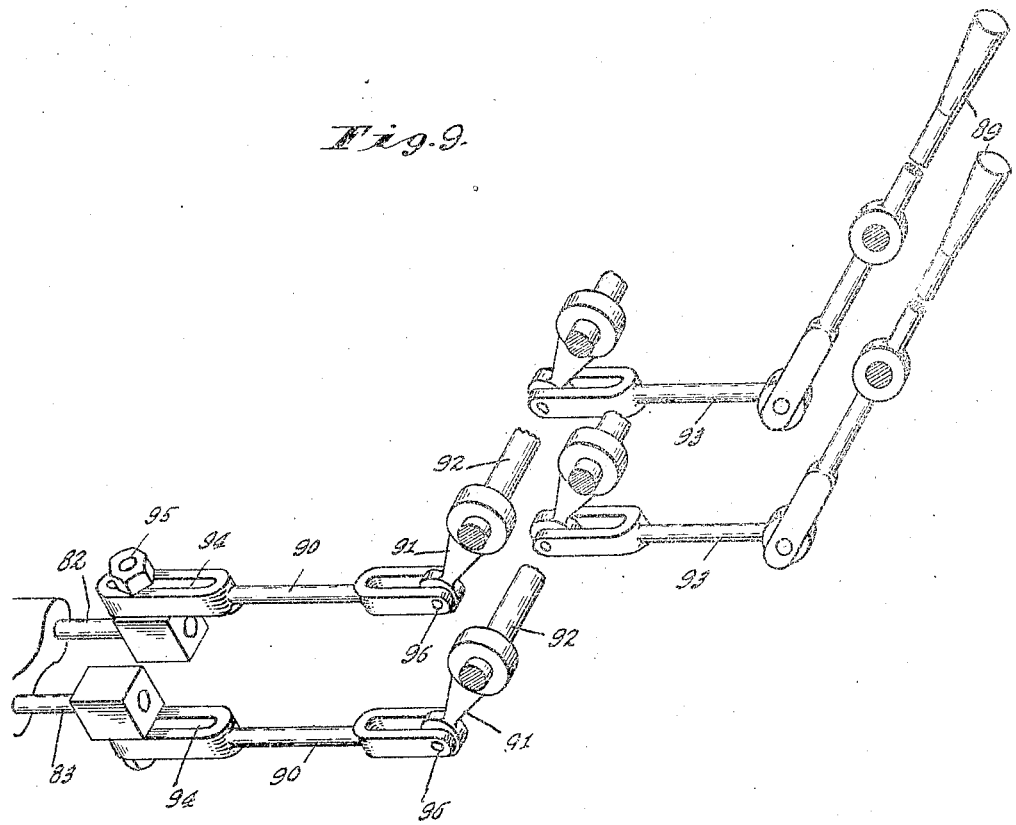
Figure 10:
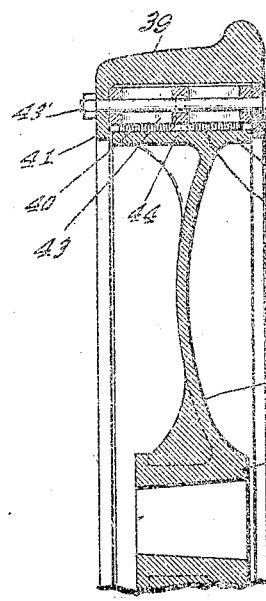
Figure 11:
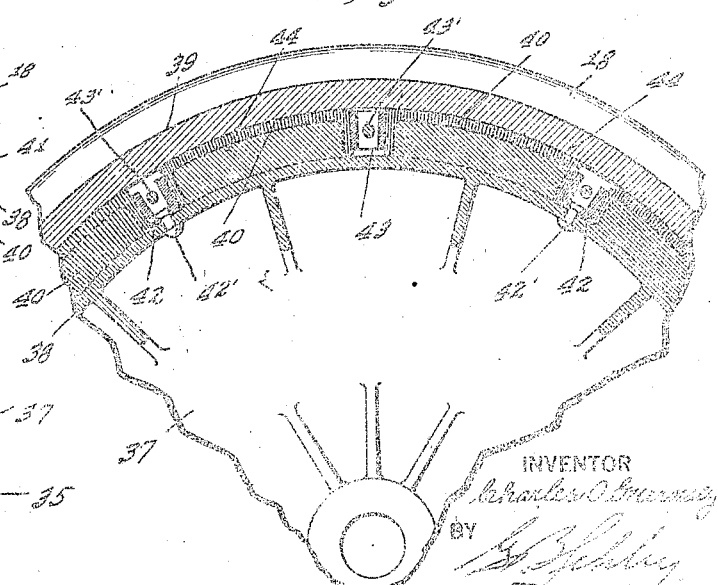

The accompanying drawings illustrate my invention: Fig. 1 is a perspective view of a railway coach embodying my invention, the superstructure being shown in dotted lines because it may be varied as desired; Fig. 2 is a fragmentary longitudinal vertical section through the front end of the coach frame and the front truck, showing the drive and the transmission; Fig. 3 is a perspective view of the front truck, per se; Fig. 4 is a plan of the front truck, on a curve in the track, so that the axis of the truck is at an angle to the axis of the coach and of the driving engine; Fig. 5 is a front elevation of the front truck, with some parts broken away and in section; Fig. 6 is a fragmentary central vertical longitudinal section through the middle part of the front truck and a superposed fragment of the coach frame, to show the auxiliary transmission mechanism on the truck, both ends of the truck being broken away; Fig. 7 is a fragmentary horizontal section substantially on the line 7—7 of Fig. 5, to show the interlock between the two gear-shift rods in the auxiliary transmission; Fig. 8 is a section on the dotted line 8—8 of Fig. 7, to show the reverse drive; Fig. 9 is a perspective view of the operating mechanism for the shiftable gears of the auxiliary mechanism; and Figs. 10 and 11 are fragmentary sectional details of one of the wheels.

The railway coach has a suitable coach frame 10, on which is any desired superstructure 11; the superstructure shown is for a passenger coach. This frame is supported on a front truck 12 and a rear truck 13; each truck is provided with a plurality of axles 14 and 15, and 16 and 17, respectively; and each axle is provided at each end with a track-engaging wheel 18. The two axles 14 and 15 of the front truck 12 are driven by an engine 19 mounted on the front end of the frame 10, and shown provided with the usual cooling radiator 20 also mounted on the frame 10. Behind the engine 19 is a multi-speed transmission mechanism 21. The engine 19 and the transmission mechanism 21 may be of any desired type, with any suitable clutch 22 between them; and my present invention is not concerned with their details. For the transmission mechanism 21, I find it convenient to use one which provides a plurality of speeds, four speeds for instance, in one direction, with no reverse, the reverse mechanism being provided on the front truck. The engine 19, transmission mechanism 21, and clutch 22 are preferably made as a single removable unit; which, after first removing the radiator 20, can be withdrawn as a whole from the front of the frame 10 without disturbing the trucks or the mechanism carried by the front truck.

Each truck has a frame formed of two side rails 25 interconnected by cross members 26; these include two spaced cross members 26 near the middle of the truck. The side members 25 project fore and aft beyond the axles 14 and 15, overhanging such axles and being offset upwardly over them, and being inside of but fairly close to the wheel planes. The truck frame is directly carried by leaf springs 27, one at each end of each axle.

These springs are shown as underslung semi-elliptic springs, and are pivotally attached at their ends toward the center of the truck to the under side of the side rails 25 by pivot bolts 28, while at their other ends they have a sliding mounting below the ends of such side rails, above retaining bolts 29. These springs 27 are in the vertical planes of the side members. Each pair of springs 27 at the two ends of an axle is attached to a housing 30 for that axle. The axle extends longitudinally through the housing 30 from one wheel 18 to the other, the axle being mounted in the housing on suitable bearings 31 near the ends of the housing 30, and also near the middle of the housing in the case of the front or driving truck. The bearings 31 in the ends of the housing 30 are thus inboard bearings; and they are preferably in the vertical planes of the side rails 25 and springs 27, as is clear from the upper left-hand corner of Fig. 4. Thus the truck frames 25 are spring-mounted from the axle housings 30.

The wheels 18 are rigidly attached to the ends of the axles, as by having tapered hubs 35 held on the tapered ends of the axles by clamping nuts 36. Preferably the wheels 18 are cushion wheels. In the preferred construction shown, the hub 35 of each wheel carries an outwardly projecting dished disk 37 provided at its outer edge with a felly 38, between which felly and the wheel tire 39 is a circumferential series of rubber masses or segments 40, which are suitably enclosed between the tire and felly and flanges 41 projecting inward from the tire past the edges of the felly. The rubber segments 40 are located between cross-boxes 42 and 43 carried respectively by the felly 38 and the tire 39 and alternately arranged around the wheel. The boxes 42 are held to the felly 38 by rivets 42'; and cross bolts 43' extend between the flanges 41 through the boxes 42 and 43, alternate bolts holding the boxes 43 to such flanges. The rubber segments 40 are arranged in pairs, as is clear from Fig. 10, and the two segments of each pair are separated by a segmental fin 44 projecting outward from about the middle of the felly 38. The torque between the tire and the felly is normally transmitted through the rubber masses 40.

This cushion-wheel arrangement thus provides a cushion mounting for the bulk of the wheel structure, and a cushion drive. This reduces the unsprung weight of the coach to the tires 39, alone; because of the normal cushioning effect of the rubber masses 40. Thus the rubber masses 40 co-operate with the springs 27 in resiliently mounting the trucks.

A truck bolster 45 extending across the truck lies between the two intermediate cross members 26 of the truck frame. It is mounted on links 46 at its ends; which links are attached by pivot bolts 47 to the ends of the truck bolster 45 near the bottom thereof, and are swung from pivot bolts 48 mounted in the ends of the middle cross members 26 near the top thereof and passing through suitably located slots 49 in the upper parts of the ends of the truck bolster 45. The two links 46 normally slant downward and outward, so that their lower ends are further apart than their upper ends. This makes for easy riding, by tilting upward that side of the coach frame 10 which swings outwardly.

At its middle, each truck bolster 45 is provided with a cup 50 and a pivot bolt 51. The cup 50 receives a downwardly projecting ball 52 at the middle of the car bolster 53, and the pivot bolt 51 projects upward through the center of said ball 52 and is suitably held therein, as by a clamping nut 54. The bolster 53 is provided on the bottom at its ends with bearing faces 55, for cooperating with bearing faces 56 on the upper side of the truck bolster 45 near its ends, to prevent the coach frame 10 from tilting with relation to the truck bolster 45. The co-operating faces 55 and 56 on the coach bolsters and truck bolster move on each other as the trucks turn relatively to the frame 10 about the axes of the pivot bolts 51, and are preferably very slightly spaced apart to reduce the friction of such turning.

In the arrangement shown, the front truck is the driving truck, and drives through both its axles 14 and 15. The rear truck is merely a supporting truck, as shown, and does no driving; but there is no reason why it also should not be used for driving if that is desired. Either truck can be readily removed as a unit, with the various parts it carries, by jacking up the corresponding end of the coach frame 10.

The front or driving truck carries an auxiliary transmission, in the drive train between the main transmission 21 and the two driving axles 14 and 15. The auxiliary transmission shown provides two speeds forward and one backward, and any of these can be used with any of the speeds provided by the main transmission 21.

This auxiliary transmission in the front truck 12, as shown, comprises three parallel shafts extending longitudinally of the front truck, and comprising an incoming-power shaft 60; an outgoing-power shaft 61, and a reverse shaft 62, all mounted in suitable bearings in the truck bolster 45. The shaft 60 is conveniently mounted directly above the shaft 61, while the reverse shaft 62 is off to one side. The forward end of the incoming-power shaft 60 is connected to the outgoing-power shaft 63 of the main transmission 21 by a propeller shaft 64, provided with two universal joints 65 and with a slip joint 66, so that it may vary in both length and angle as conditions require. Each end of the outgoing-power shaft 61 of the auxiliary transmission is connected to the adjacent axle 14 or 15 by a propeller shaft 67, also provided with two universal joints 68. Conveniently at least one of the universal joints 68 in each propeller shaft 67 is of the flexible-disk type, the one nearest the associated axle being so shown, to allow for variation in effective length of the propeller shaft; although even then I prefer to provide a slip joint 68' in the propeller shaft. The far end-portion of each propeller shaft 67 beyond the end of the flexible-disk universal joint is mounted in suitable bearings in a central enlargement 69 of the housing 30 of the associated axle 14 and 15; and may be a separate shaft section carried by the housing for convenience in assembling and dismantling; and is drivingly geared to its axle, conveniently by simple gearing 70.

In the auxiliary transmission on the driving truck, two gears 71 and 72 of different size are fixed on the outgoing-power shaft 61, and mesh respectively with pinions 73 and 74 of inversely different size loosely mounted on the incoming-power shaft 60. Between the two pinions 73 and 74, a sliding gear 75 is splined on the incoming-power shaft 60. Adjacent faces of the pinions 73 and 74 and the sliding gear 75 are provided with clutch teeth 76, so that by sliding the gear 75 to one end or the other of its axial movement on the shaft 60 either pinion 73 or 74 may be locked to such shaft by the intermeshing of the associated clutch teeth 76. When either set of clutch teeth 76 is intermeshed, and its associated pinion 73 or 74 is thereby locked to the incoming-power shaft 60, there is a gearing connection between the shafts 60 and 61; but this gearing connection is of different ratio for the two sets of gearings 71—73 and 72—74, according to the sizes chosen for the respective pinions and gears. Both of these gearings are constant-mesh gearings, and the only drive from the shaft 60 to the shaft 61 is through gearing. The two gearings 71—73 and 72—74 provide two forward speeds of the auxiliary transmission. The sliding gear 75 has an intermediate position in which both sets of clutch teeth 76 are out of mesh. When the gear 75 is in this intermediate position, a sliding gear 77 on the reverse shaft 62 may be slid along such reverse shaft into mesh with it. This reverse shaft 62 also carries a gear 78 in constant mesh with one of the gears 71 and 72—the gear 71 as shown. Thus the intermeshing of the gears 75—77 produces the reverse drive of the shaft 61, from the shaft 60 through the gears 75, 77, 78, and 71 and the reverse shaft 62.

The gears 75 and 77 are shifted by yokes 80 and 81, fixed on two shift rods 82 and 83, respectively. These two shift rods are interlocked, in the usual manner of shift rods, by a floating cross-pin 84 co-operating with notches 85 and 86 in the respective shift rods, so that the notches come opposite such pin when the gear 75 is in its middle position and the gear 77 is shifted axially well out of mesh with the gear 75; whereby the gear 77 can be shifted into mesh with the gear 75 to produce reverse driving only when the gear 75 is de-clutched from both the pinions 73 and 74, and the gear 75 may be shifted to produce meshing with either set of clutch teeth 76 only when it is not intermeshed with the gear 77. This makes it impossible to produce conflict of gearing, as only one gear train can be completed at one time between the shafts 60 and 61.

The gear-shift rods 82 and 83 also preferably have the usual spring-pressed positioning pins 87 co-operating with suitable notches in the rods, for holding the gear-shift rods in their respective positions, and enabling the operator to "feel" when the desired positioning of the gears is obtained. This is especially desirable because, as will shortly appear, the gear shift levers at the operative's seat do not have definite positions for any given positions of the rods 82 and 83.

The gear-shift rods 82 and 83, like the shafts 60, 61, and 62, are mounted in the truck bolster 45. They are conveniently mounted to one side of the longitudinal axis of the truck, as is clear from Figs. 5 and 7, to get in convenient relation to the shafts 60 and 62 which support the gears which they control. These gear-shift rods project forward from the truck bolster, as is clear from Fig. 4, and are connected through suitable intermediate mechanism to gear-shift levers 89 convenient to the operator. This intermediate mechanism in each case includes a fore and aft transmission rod 90 connected to the gear-shift rods 82 and 83 at the rear end and to an arm 91 carried by a cross-shaft 92 on the coach frame 10 at the front end; which cross-shaft is connected by a link 93 and suitable arms to the operator's gear-shift lever 89. The transmission rod 90 provides an extensible connection with some universal movement between the parts it connects; as shown it has a slot 94 at its rear end fitting slidably on a vertical pin 95 on the rod 82 or 83, and a loose transverse pivot-pin connection 96 with the arm 91. This is needed because of the relative motion between the truck and the coach frame 10, due to the turning of the truck and augmented by the fact that the gear-shift rods 82 and 83 are not on the longitudinal axis of the truck, but are offset laterally therefrom; because of which the intermediate mechanism between the gear-shift lever and the gear-shift rod must provide for lost-motion, and this lost-motion must be taken up before the gear-shift rod is actuated. The gear-shift lever 89, therefore, does not have a definite position for its associated gear-shift rod 82 or 83, and the operator operates his gear-shift lever first to take up the lost-motion and then to shift the gear-shift rod until he "feels" that it has reached the desired position.

Preferably both trucks 12 and 13 are provided with suitable brakes 97, operated in any convenient way. These brakes and their method of operation constitute no part of my present invention, and may be varied as desired.

In operation, the operator drives with the engine 19 normally running, and controls the car by his clutch 22 and by shifting his gears in his main transmission 21 and in the auxiliary transmission on the driving truck, and by varying the speed of the engine by the usual throttle control. For starting, the operator ordinarily shifts the main transmission 21; but save for starting, the gear control is ordinarily by shifting the auxiliary transmission, leaving the main transmission in high, since the auxiliary transmission is equally efficient for either set of gears. For forward driving at light load, he uses the higher-speed gearing 74—72 of the auxiliary transmission, as when the coach is traveling on the level; but for heavy-load driving, as when the coach is climbing a hill, he uses the lower-speed gearing 73—71 of the auxiliary transmission. For reverse driving, he shifts the gear 75 to its middle position and intermeshes the gear 77 with it. For both of these forward speeds and the reverse drive of the auxiliary transmission, he can get the full number of starting speeds provided by the main transmission 21. All three of the drives in the auxiliary transmission are of substantially equal efficiency, as already stated, since they are all gear drives from one to the other of two parallel shafts; so that the operator will have no inclination because of better driving due to direct connection to use the high-speed drive of the auxiliary transmission with the resultant straining of the engine when the conditions demand the use of the low-speed drive of the auxiliary transmission.

As the coach travels, the link mounting of the truck bolster 45 permits such truck bolster to sway with varying tilting from the level to oppose the throwing of the passengers outward when the coach lurches sidewise; the coach body receives little vertical vibration because the shocks are taken up by the resilient rubber segments 40 and by the springs 27, so that only the tires 39 of the wheels are completely unsprung, and only the wheels and axles and the axle housings are even partially unsprung; and the various universal joints and slip joints permit all the necessary movements of the interconnected parts upon relative movement of the truck and the coach frame and of the axles and truck frame. The trucks turn about their pivot bolts 51, and the co-operating faces 55 and 56 slide upon one another as required to hold the coach frame in proper position relative to the truck bolsters. Both axles 14 and 15 of the front truck 12 drive the car, receiving power from the engine 19 through the intermediate mechanism above described, the power dividing at the shaft 61 to go to the two axles.

I claim as my invention:

1. In combination, a coach frame, a plurality of supporting trucks therefor, one of said trucks comprising a frame and a plurality of axles and being pivotally connected to said coach frame, an internal combustion engine and a main variable-speed transmission mechanism mounted on said coach frame and having an outgoing-power shaft, an auxiliary variable-speed transmission mechanism mounted on said plural-axle truck and having an incoming-power shaft and an outgoing-power shaft, driving connections from said last-named outgoing-power shaft to a plurality of axles on said truck, and driving connections from the outgoing-power shaft of said engine and main transmission mechanism to the incoming-power shaft of said auxiliary transmission mechanism.

2. In combination, a coach frame, a plurality of supporting trucks therefor, one of said trucks comprising a plurality of axles and a frame having separate spring-mountings on said several axles and being pivotally connected to said coach frame, an internal combustion engine mounted on said coach frame and having an outgoing-power shaft, a variable-speed transmission mechanism mounted on said plural-axle truck and having an incoming-power shaft and an outgoing-power shaft, driving connections from said last-named outgoing-power shaft to a plurality of axles on said truck, and driving connections from the outgoing-power shaft of said engine to the incoming-power shaft of said transmission mechanism.

3. In combination, a coach frame, two supporting trucks therefor, at least one of said trucks being provided with a plurality of axles and being pivotally interconnected to said coach frame, a fore-and-aft shaft carried by said plural-axle truck, an internal combustion engine mounted on the coach frame, a propeller shaft interconnecting said engine and said truck-carried shaft and provided with means for permitting it to swing universally and to vary in length, and driving means from said truck-carried shaft to a plurality of axles of said plural-axle truck.

4. In combination, a coach frame, two supporting trucks therefor, at least one of said trucks being provided with a plurality of axles and being pivotally interconnected to said coach frame, a fore-and-aft shaft carried by said plural-axle truck, an internal combustion engine mounted on the coach frame, a propeller shaft interconnecting said engine and said truck-carried shaft and provided with two universal joints and a slip joint, and driving means from said truck-carried shaft to a plurality of axles of said plural-axle truck.

5. In combination, a coach frame, two supporting trucks therefor, at least one of said trucks being provided with a plurality of axles and being pivotally interconnected to said coach frame, a shaft carried by said plural-axle truck, an internal combustion engine mounted on the coach frame, a propeller shaft interconnecting said engine and said truck-carried shaft and provided with means for permitting it to swing universally and to vary in length, said plural-axle truck being spring-mounted on its axles, and a plurality of propeller shafts interconnecting said truck-carried shaft to different axles respectively of said plural-axle truck.

6. In combination, a coach frame, two supporting trucks therefor, at least one of said trucks being provided with a plurality of axles and being pivotally interconnected to said coach frame, a shaft carried by said plural-axle truck, an internal combustion engine mounted on the coach frame, a propeller shaft interconnecting said engine and said truck-carried shaft and provided with two universal joints and a slip joint, said plural-axle truck being spring-mounted on its axles, and a plurality of propeller shafts interconnecting said truck-carried shaft to different axles respectively of said plural-axle truck.

7. In combination, a coach frame, two supporting trucks therefor, at least one of said trucks being provided with a plurality of axles and being pivotally interconnected to said coach frame, a shaft carried by said plural-axle truck, an internal combustion engine mounted on the coach frame, a propeller shaft interconnecting said engine and said truck-carried shaft and provided with means for permitting it to swing universally and to vary in length, said plural-axle truck being spring-mounted on its axles, and a plurality of propeller shafts interconnecting said truck-carried shaft to different axles respectively of said plural-axle truck, each of said last named propeller shafts including extension and universal-motion means.

8. In combination, a coach frame, two supporting trucks therefor, at least one of said trucks being provided with a plurality of axles and being pivotally interconnected to said coach frame, a shaft carried by said plural-axle truck, an internal combustion engine mounted on the coach frame, a propeller shaft interconnecting said engine and said truck-carried shaft and provided with two universal joints and a slip joint, said plural-axle truck being spring-mounted on its axles, and a plurality of propeller shafts interconnecting said truck-carried shaft to different axles respectively of said plural-axle truck, each of said last named propeller shafts including extension and universal-motion means.

9. In combination, a coach frame, two supporting trucks therefor, at least one of said trucks being provided with a plurality of axles and being pivotally interconnected to said coach frame, a shaft carried by said plural-axle truck, an internal combustion engine mounted on the coach frame, a propeller shaft interconnecting said engine and said truck-carried shaft and provided with means for permitting it to swing universally and to vary in length, said plural-axle truck being spring-mounted on its axles, and a plurality of propeller shafts interconnecting said truck-carried shaft to different axles respectively of said plural-axle truck, each of said last named propeller shafts including two universal joints, at least one of which is of a flexible-disk type.

10. In combination, a coach frame, two supporting trucks therefor, at least one of said trucks being provided with a plurality of axles and being pivotally interconnected to said coach frame, a shaft carried by said plural-axle truck, an internal combustion engine mounted on the coach frame, a propeller shaft interconnecting said engine and said truck-carried shaft and provided with two universal joints and a slip joint, said plural-axle truck being spring-mounted on its axles, and a plurality of propeller shafts interconnecting said truck-carried shaft to different axles respectively of said plural-axle truck, each of said last named propeller shafts including two universal joints, at least one of which is of a flexible-disk type.

11. In combination, a coach frame, two supporting trucks therefor, at least one of said trucks having a plurality of axles and being pivotally connected to said coach frame, said plural-axle truck being provided with a swingingly mounted truck bolster, and said coach frame having a bolster co-operating with said truck bolster, an internal combustion engine mounted on said coach frame, a shaft carried by said truck bolster, a driving connection from said engine to said shaft, said driving connection permitting the necessary movements of said truck and truck bolster, and driving connections from said shaft to a truck axle.

12. In combination, a coach frame, two supporting trucks therefor, at least one of said trucks having a plurality of axles and being pivotally connected to said coach frame, said plural-axle truck being provided with a swingingly mounted truck bolster, and said coach frame having a bolster co-operating with said truck bolster, an internal combustion engine mounted on said coach frame, a transmission mechanism carried by said truck bolster, a driving connection from said engine to said transmission mechanism, said driving connection permitting the necessary movements of said truck and truck bolster, and driving connections from said transmission mechanism to a truck axle.

13. In combination, a coach frame, two supporting trucks therefor, at least one of said trucks having a plurality of axles and being pivotally connected to said coach frame, said plural-axle truck being provided with a swingingly mounted truck bolster, and said coach frame having a bolster co-operating with said truck bolster, an internal combustion engine mounted on said coach frame, a shaft carried by said truck bolster, a driving connection from said engine to said shaft, said driving connection permitting the necessary movements of said truck and truck bolster, and driving connections from said shaft to a plurality of axles of said plural-axle truck.

14. In combination, a coach frame, two supporting trucks therefor, at least one of said trucks having a plurality of axles and being pivotally connected to said coach frame, said plural-axle truck being provided with a swingingly mounted truck bolster, and said coach frame having a bolster co-operating with said truck bolster, an internal combustion engine mounted on said coach frame, a transmission mechanism carried by said truck bolster, a driving connection from said engine to said transmission mechanism, said driving connection permitting the necessary movements of said truck and truck bolster, and driving connections from said transmission mechanism to a plurality of axles of said plural-axle truck.

15. In combination, a coach frame, two supporting trucks therefor, at least one of said trucks having a plurality of axles and being pivotally connected to said coach frame, said plural-axle truck being provided with a swingingly mounted truck bolster, and said coach frame having a bolster co-operating with said truck bolster, an internal combustion engine mounted on said coach frame, a shaft carried by said truck bolster, a driving connection from said engine to said shaft, said driving connection permitting the necessary movements of said truck and truck bolster, and driving connections from said shaft to a plurality of axles of said plural-axle truck, said plural-axle truck being spring-mounted on its axles and said last named connections being arranged to provide for the necessary movement between said axles and the truck bolster.

16. In combination, a coach frame, two supporting trucks therefor, at least one of said trucks having a plurality of axles and being pivotally connected to said coach frame, said plural-axle truck being provided with a swingingly mounted truck bolster, and said coach frame having a bolster co-operating with said truck bolster, an internal combustion engine mounted on said coach frame, a transmission mechanism carried by said truck bolster, a driving connection from said engine to said transmission mechanism, said driving connection permitting the necessary movements of said truck and truck bolster, and driving connections from said transmission mechanism to a plurality of axles of said plural-axle truck, said plural-axle truck being spring-mounted on its axles and said last named connections being arranged to provide for the necessary movement between said axles and the truck bolster.

17. In combination, a coach frame, a plurality of supporting trucks therefor, one of said trucks comprising a frame and a plurality of axles and being pivotally connected to said coach frame, an internal combustion engine and a main variable-speed transmission mechanism mounted on said coach frame and having an outgoing-power shaft, an auxiliary variable-speed transmission mechanism mounted on said plural-axle truck and having an incoming-power shaft and an outgoing-power shaft, driving connections from said last-named outgoing-power shaft to an axle on said truck, and driving connections from the outgoing-power shaft of said engine and main transmission mechanism to the incoming-power shaft of said auxiliary transmission mechanism.

18. In combination, a coach frame, a plurality of supporting trucks therefor, one of said trucks comprising a plurality of axles and a frame having separate spring-mountings on said several axles and being pivotally connected to said coach frame, an internal combustion engine mounted on said coach frame and having an outgoing-power shaft, a variable-speed transmission mechanism mounted on said plural-axle truck and having an incoming-power shaft and an outgoing-power shaft, driving connections from said last-named outgoing-power shaft to an axle on said truck, and driving connections from the outgoing-power shaft of said engine to the incoming-power shaft of said transmission mechanism.

19. In combination, a coach frame, a plurality of supporting trucks therefor, one of said trucks comprising a frame and a plurality of axles and being pivotally connected to said coach frame, an internal combustion engine and a main variable-speed transmission mechanism mounted as a single unit on said coach frame and removable as a unit therefrom and having an outgoing-power shaft, an auxiliary variable-speed transmission mechanism mounted on said plural-axle truck, and driving connections from said shaft to said auxiliary transmission mechanism and from said auxiliary transmission mechanism to one or more axles of said truck.

20. In combination, a coach frame, a plurality of supporting trucks therefor, one of said trucks comprising a frame and a plurality of axles and being pivotally connected to said coach frame, an internal combustion engine mounted on said coach frame and having an outgoing-power shaft, a variable-speed transmission mechanism mounted on said plural-axle truck, driving connections from said shaft to said transmission mechanism and from said transmission mechanism to one or more axles on said truck, shifting means carried by said truck for operating said variable-speed transmission mechanism, operating means carried by said coach frame, and connections from said operating means to said shifting means, said last-named connections and the driving connections from said shaft to said variable-speed transmission mechanism being arranged to permit relative swinging of the truck and coach frame.

21. In combination, a coach frame, a plurality of plural-axle trucks supporting said coach frame, each of said trucks including a wheel-and-axle-supported truck-frame and a truck-bolster on said truck-frame, with separate springs between each axle and the truck-frame, said coach frame having a bolster co-operating with each truck-bolster, a shaft carried by the truck bolster of at least one truck, driving connections from said shaft to one or more axles of said truck, an internal combustion engine carried by said coach frame, and driving connections from said engine to said shaft.

22. In combination, a coach frame, a plurality of plural-axle trucks supporting said coach frame, each of said trucks including a wheel-and-axle-supported truck-frame and a truck-bolster on said truck-frame, with separate springs between each axle and the truck-frame, said coach frame having a bolster co-operating with each truck-bolster, a shaft carried by the truck bolster of at least one of said trucks, driving connections from said shaft to one or more axles of said truck, and means for driving said shaft.

23. In combination, a coach frame, a plurality of plural-axle trucks supporting said coach frame, each of said trucks including a wheel-and-axle-supported truck-frame and a truck-bolster on said truck-frame, said coach frame having a bolster co-operating with each truck-bolster, a variable-speed transmission mechanism carried by the truck bolster of at least one truck, driving connections from said variable-speed transmission mechanism to one or more axles of said truck, an internal combustion engine carried by said coach frame, and driving connections from said engine to said variable-speed transmission mechanism.

In witness whereof, I CHARLES O. GUERNSEY have hereunto set my hand at Wabash, Indiana, this twenty-third day of June, A. D. one thousand nine hundred and twenty two.

CHARLES O. GUERNSEY.